Patented May 1, 1945

2,374,766

UNITED STATES PATENT OFFICE 2,374,766

BITUMEN EMULSION

Evart E. Mayfield, Wilmington, Del., assignor to Hercules Powder Company, Wilmington, Del., a corporation of Delaware No Drawing. Application March 25, 1941,
Serial No. 385,134

4 Claims. (Cl. 252—311.5)

This invention relates to water emulsions of bituminous substances of natural or artificial origin such as asphalt and asphaltic products and more particularly to a method for the control of the viscosity of water emulsions of bituminous materials.

Bituminous emulsions have been used by the prior art in a great many ways, for example, emulsions of bituminous or asphaltic materials may be used for paving road surfaces, impregnating materials such as paper or felt for use as roofing or insulation purposes, coating of various materials for waterproofing, incorporating with other materials for waterproofing or binding and as a paint or a coating material to prevent corrosion.

Application of bituminous emulsions to the various uses is normally carried out by machinery and they must therefore have a controlled viscosity in order that proper flow either on or into road surfaces or materials to be coated or impregnated may be obtained.

The control of the viscosity of bituminous emulsions is quite often difficult especially when there are specifications which require definite amounts of solid material to be present in the emulsion. Asphalts and asphaltic materials which are used to manufacture the bituminous emulsions are seldom of the same physical make-up. It is well known that asphalt from different deposits or from different manufacturers vary considerably and also even lots from the same deposit or the same manufacture are difficult to duplicate. Each lot of asphalt presents a problem in the manufacture of emulsions, since it may effect the viscosity in different ways even though the means of emulsifying is controlled within narrow limits.

It is the object of this invention to provide bituminous emulsions of controlled physical properties.

It is a further object of this invention to provide bituminous emulsions having the desired viscosity.

A further object of this invention is to provide a method whereby the physical properties of bituminous emulsions may be controlled.

A further object of this invention is to provide a method whereby the viscosity of asphalt emulsions may be controlled.

A further object of this invention is to provide a material which may be added to bituminous emulsions to raise the viscosity value.

A further object of this invention is to provide a viscosity controlling material which requires no preservative.

A further object of this invention is to provide a method of controlling the stability and dehydration value of asphalt emulsions.

A still further object of this invention is to provide an improved asphalt emulsion.

Other and further objects will be apparent hereinafter.

In general, the purposes of my invention have been accomplished by processing bituminous materials suitable for the preparation of asphaltic emulsions by admixing therewith a dispersing agent and a controlling agent. The controlling agent which I have found most preferable in accordance with this invention is methyl cellulose. The preparation of asphaltic or bituminous emulsions by using as a dispersing agent materials such as, for example, saponified rosin, saponified fish oil, saponified substantially petroleum-hydrocarbon insoluble pine wood resin, gum rosin soap, neutral rosin size, Kidney rosin oil soap and the like is carried out in any well-known manner, such as for example, by the use of a colloid mill or a high speed agitator and to these prepared emulsions there is added at any time during the preparation a controlled amount of methyl cellulose either in water solution or as a solid. The addition of methyl cellulose is preferably made by means of a water solution, since the methyl cellulose need only be added to the emulsion in a very minor amount, for example, usually less than 1% on the basis of the total weight of the emulsion in order to alter the viscosity value.

The testing of numerous samples of bituminous emulsions containing various minor percentages of methyl cellulose, showed that the viscosity of the emulsions could be raised and controlled over a considerable range of values. Further advantages were noted in the demulsibility and dehydration values.

In some instances an abnormally high increase in the viscosity of the emulsion in comparison to the percentage of methyl cellulose added was obtained. This abnormal effect of the methyl cellulose on some viscosity values was found to be present when dispersing agents of the resin soap class were used but is not experienced when using some of the other types of dispersing agents well known to the art.

It is believed that the increase in viscosity obtained by the addition of minor percentages of methyl cellulose to bituminous emulsions normally is brought about because the viscosity of the water phase is increased by the addition of the methyl cellulose but when the dispersing agent used is from the resin soap class, the addition of the methyl cellulose gives particularly high viscosity values. The high values are believed to be the result of a precipitation of the methyl cellulose by the resin soap. The use of the proper dispersing agent, it is believed, precipitates the methyl cellulose in the emulsion in the form of large chain-like particles or aggregates and thereby abnormally increases the viscosity. However, this theory is not to be construed as limiting my invention.

In order to more specifically describe my invention and to show the increase in the viscosity value effected by the addition of methyl cellulose to bituminous emulsions prepared with various dispersing agents, the following examples are presented. All parts and percentages are by weight unless otherwise specified.

Example I

For the purposes of comparison, an emulsion was prepared from Venezuelan asphalt by using saponified substantially petroleum-hydrocarbon insoluble pine wood resin as the emulsifying agent. This admixture of asphalt and a dispersing agent was emulsified with water so that the asphalt content was 65% based on the weight of the total emulsion. From this 65% emulsion a sample of asphalt emulsion containing 60% of asphalt was prepared and the viscosity determined. The viscosity was 46.2 seconds as determined by the Saybolt Furol method at 77° F. All other viscosities mentioned hereinafter will be by the same method and at the same temperature.

Example II

A 60% asphalt emulsion containing methyl cellulose was prepared by adding to 92.5 parts of the 65% asphalt emulsion described in Example I, 7 parts of water and ½ part of a 2% methyl cellulose water solution. The viscosity of the emulsion was 63.2 seconds. It will be noted that the emulsion prepared contains .01% methyl cellulose and that this addition raised the viscosity by 17 seconds.

Example III

An asphalt emulsion containing 60% asphalt and .02% methyl cellulose was prepared from the 65% asphalt emulsion described in Example I. The viscosity thereof was 98 seconds.

Example IV

An asphalt emulsion containing 60% asphalt and .04% methyl cellulose was prepared from the 65% asphalt emulsion described in Example I. The viscosity of this emulsion was so high that it was impossible to determine the value thereof by the Saybolt Furol method.

Example V

An asphalt emulsion was made up as follows: Asphalt—600 parts, water—400 parts, saponified fish oil—10 parts, NaOH—2 parts, 100 parts of the emulsion was diluted with 10 parts of water and had a Furol viscosity of 17 seconds. 100 parts of the same emulsion diluted with 10 parts of a 2% high viscosity methyl cellulose solution had a viscosity of 32 seconds.

Example VI

An emulsion with 60% asphalt, 2% H gum rosin soap, 0.2% NaOH had a viscosity of 44 seconds. By adding 10 parts of 2% methyl cellulose solution to 100 parts of the emulsion, the viscosity was increased to 73 seconds.

Example VII

An emulsion with 60% asphalt, 0.5% Ligro soap, 0.1% NaOH had a Furol viscosity of 36 seconds. Adding 10 parts of 2% methyl cellulose solution to 100 parts of this emulsion increased the viscosity to 54 seconds.

Example VIII

An emulsion with 60% asphalt, 1.5% Kidney Rosin oil soap and 0.2% NaOH had a Furol viscosity of 42 seconds. The addition of 10 parts of methyl cellulose solution to 100 parts of this emulsion increased the viscosity to 165 seconds.

Example IX

Emulsions containing methyl cellulose may also show decreased demulsification values as is shown by the following comparison. An emulsion prepared from Venezuelan asphalt by emulsifying together 600 parts of asphalt, 400 parts of water, 3 parts of saponified substantially petroleum-hydrocarbon insoluble pine wood resin and 1.6 parts KOH was tested for demulsibility value by a .02N CaCl₂ solution and gave a result of about 70%. A sample of this emulsion when containing .02% of methyl cellulose gave a demulsibility value of only 50%. This shows a marked increase in stabilization.

The demulsibility value is in accordance with the test described in "American Society for Testing Materials," D244–36T.

An increase in the dehydration value of emulsions was obtained when methyl cellulose was added thereto, and the dispersing agent was of the resin soap class. This increase is shown in the following examples.

Example X

An emulsion containing about 60% asphalt was prepared and tested for dehydration value by allowing it to remain in an oven at 100° F. for four days in the presence of CaCl₂. The dehydration value obtained was about 44%.

Example XI

An emulsion exactly similar to that described in Example VI but with the addition of .01% methyl cellulose was tested for dehydration value by the same procedure given in Example X. The dehydration value obtained was 50%.

Example XII

A dehydration value of about 50% was also obtained upon testing an emulsion exactly similar to that described in Example VI but with the addition of .02% methyl cellulose.

Example XIII

A dehydration value of above 50% was also obtained upon testing an emulsion exactly similar to that described in Example VI but with the addition of .04% methyl cellulose.

Although most of the above examples are of emulsions of about 60% asphalt and 40% water, this proportion may be greatly varied with comparable results. Thus, the asphalt may be present from 10 to 70% while the water may vary from 30 to 90% based on the weight of the total emulsion.

From the above examples, it is apparent that by the addition of methyl cellulose to bituminous emulsions the viscosity thereof may be easily controlled and that other values such as the demulsibility and dehydration altered. This possibility of controlling properties of the emulsions by the addition of methyl cellulose has been found advantageous, since many bituminous emulsions prepared are outside of the specification values for viscosity and must be corrected.

In accordance with the invention any dispersing agent may be used in preparing bituminous emulsions that are to have their viscosities controlled by additions of methyl cellulose. The amount of dispersing agent will be less than 2% and normally less than 1% by weight. The viscosity control is particularly effective when either saponified substantially petroleum-hydrocarbon insoluble pine wood resin, or saponified B-wood rosin, is used as the dispersing agent either alone or in admixture with each other or in admixture with other well-known dispersing agents B-wood rosin being a very dark grade of rosin containing about 40-70%, usually about 60%, of petroleum hydrocarbon-insoluble resinous material, the remainder being gasoline-soluble. It is obtained as the colored fraction in selective solvent refining of crude wood rosin to form pale rosin.

The use of methyl cellulose is not accompanied by the spoilage or putrefaction experienced with many materials added to asphaltic emulsions and hence no preservative need be used. This constitutes a definite advantage.

The addition of methyl cellulose has been found to be most convenient if it is first dissolved in water; however, this is not essential as the methyl cellulose may be added in solid form or in any other solvent. The percentage of methyl cellulose added to the bituminous emulsions may vary from less than .01% to as high as 2 or 3% but normally less than .1% is sufficient to obtain the desired control. However, with some dispersing agents, especially the saponified resins, additions above 0.1% will normally cause the emulsions to be so viscous as to be unsuited in many uses. The most desirable percentage of methyl cellulose to be added is between about .01 and .025% with these dispersing agents.

Although in the above examples a Venezuelan asphalt has been used, any of the various asphalts may be used whether they are of natural origin or are manufactured. The numerous asphalts or bitumens are well known to the art and need not be enumerated here.

By the term "substantially petroleum-hydrocarbon insoluble pine wood resin," I mean a resinous material which may be prepared from pine wood, preferably from stump pine wood, in the following manner. The pine wood, which may or may not have been steamed to remove volatile constituents, such as turpentine and pine oil, may be extracted with a coal tar hydrocarbon, such as benzol or toluol, and the extract then freed of volatile constituents, leaving a residue consisting of a mixture of wood rosin and the resin used in the present compositions. Extraction of this mixture with a petroleum hydrocarbon such as, for example, gasoline, dissolves and removes the rosin. After separation of the rosin, high in abietic acid, a resinous residue remains which is low in abietic acid. Alternatively, the initial coal tar hydrocarbon extract may be treated with furfural, and the two layers which form separated, in which case the resinous residue is found dissolved in the furfural. This resinous residue, used in the composition of the present invention, is characterized by a dark red brown color, cherry red in solution, and by substantial insolubility in petroleum hydrocarbons, but it will vary somewhat in its specific characteristics such as acid number, melting point, exact petroleum ether solubility, and content of naphtha and toluol insoluble material, depending upon the details of the extraction processes utilized. This resin will meet or nearly meet the following specifications, namely, substantial insolubility in petroleum hydrocarbons, substantially complete solubility in alcohol, a methoxy content from about 3% to about 7.5% (usually from about 4% to about 6%) an acid number in the range from about 90 to about 110, and a drop melting point in the range from about 95° C. to about 125° C.

It will be understood that the details and examples hereinbefore set forth are illustrative only and that the invention as broadly described and claimed is in no way limited thereby.

What I claim and desire to protect by Letters Patent is:

1. A stable asphalt emulsion capable of forming water-resistant films and capable of controlled viscosity, comprising asphalt, water, a dispersing agent of saponified substantially petroleum-hydrocarbon insoluble pine wood resin, and a stabilizing, dehydration, and viscosity controlling agent of methyl cellulose in an amount between about 0.01% and about 0.1% by weight, based on the total weight of the emulsion.

2. A stable asphalt emulsion capable of forming water-resistant films and capable of controlled viscosity, comprising asphalt, water, a dispersing agent of saponified B-wood rosin, and a stabilizing, dehydration, and viscosity controlling agent of methyl cellulose in an amount between about 0.01% and about 0.1% by weight, based on the total weight of the emulsion.

3. An asphalt emulsion characterized by increased viscosity, stability, and dehydration, having the following approximate composition by weight:

| | Per cent |
|---|---|
| Asphalt | 10 –70 |
| Water | 30 –90 |
| Saponified substantially petroleum hydrocarbon-insoluble pine wood resin | 0.2 – 2 |
| Methyl cellulose | 0.01– 0.1 |

4. A stable asphalt emulsion, capable of controlled viscosity, comprising asphalt, water, a dispersing agent of a saponified resinous material selected from the group consisting of substantially petroleum hydrocarbon-insoluble pine wood resin and B-wood rosin, and a stabilizing, dehydration, and viscosity controlling agent of methyl cellulose in an amount between about 0.01% and about 0.1% by weight of the emulsion.

EVART E. MAYFIELD.